US005589122A

United States Patent [19]
Leonard et al.

[11] Patent Number: 5,589,122
[45] Date of Patent: Dec. 31, 1996

[54] METHOD OF MAKING DOUBLE-SIDED PRESSURE-SENSITIVE ADHESIVE TAPE

[75] Inventors: William K. Leonard, Troy Township, Wis.; Kirit C. Mody, Shoreview; Richard J. Rolando, Oakdale, both of Minn.

[73] Assignee: Minnesota Mining And Manufacturing Company, St. Paul, Minn.

[21] Appl. No.: 412,758

[22] Filed: Mar. 29, 1995

Related U.S. Application Data

[60] Division of Ser. No. 166,549, Dec. 14, 1993, abandoned, which is a continuation-in-part of Ser. No. 769,548, Oct. 1, 1991, abandoned.

[51] Int. Cl.$^6$ .................................................. B29C 47/06
[52] U.S. Cl. ............. 264/146; 156/244.11; 156/244.25; 264/148; 264/171.13; 264/172.19; 264/172.17; 264/213; 264/236; 425/132
[58] Field of Search .................. 264/146, 148, 264/171.13, 172.19, 173.17, 213, 338, 236, 347; 156/244.11, 243, 908, 244.25; 425/132

[56] References Cited

U.S. PATENT DOCUMENTS

| Re. 24,906 | 12/1960 | Ulrich | 206/59 |
|---|---|---|---|
| 2,532,011 | 11/1950 | Dahlquist et al. | 154/53.5 |
| 2,607,711 | 8/1952 | Hendricks | 117/122 |
| 3,032,181 | 6/1961 | Hutter et al. | 206/59 |
| 3,318,852 | 5/1967 | Dixon | 260/78.5 |
| 3,361,728 | 1/1968 | Coen et al. | 260/93.7 |
| 3,389,827 | 6/1968 | Abere et al. | 220/53 |
| 3,415,920 | 12/1968 | Lee et al. | 264/171 |
| 3,565,737 | 2/1971 | Lefevre et al. | 161/36 |
| 3,592,710 | 7/1971 | Yurgen et al. | 156/244.11 |
| 3,611,492 | 10/1971 | Scheibling | 18/13 P |
| 3,694,119 | 9/1972 | Scheibling | 425/131 |
| 3,788,922 | 1/1974 | Rasmussen | 264/173.12 |
| 3,823,211 | 7/1974 | Colombo | 264/47 |
| 3,985,348 | 10/1976 | Skidmore | 259/191 |
| 4,065,532 | 12/1977 | Wild et al. | 264/68 |

(List continued on next page.)

FOREIGN PATENT DOCUMENTS

| 0325007 | 7/1989 | European Pat. Off. . | |
|---|---|---|---|
| 0411820A1 | 6/1991 | European Pat. Off. . | |
| 2600981 | 1/1988 | France . | |
| 46-21120 | 6/1971 | Japan . | |
| 51-466 | 1/1976 | Japan . | |
| 37935/1976 | 3/1976 | Japan . | |
| 58-113283 | 7/1983 | Japan | 156/244.11 |
| 58-147332 | 9/1983 | Japan . | |
| 4198289 | 7/1992 | Japan . | |
| 916406 | 1/1963 | United Kingdom . | |
| 1138362 | 1/1969 | United Kingdom . | |
| WO92/19447 | 11/1992 | WIPO . | |
| WO93/07228 | 4/1993 | WIPO . | |

OTHER PUBLICATIONS

P. Cloeren, Jr., "Feedblock Coextrusion Systems", *Coextrusion*, 55–66 (1986).

*Polymer Blends* (vol. 2); D. R. Paul et al., Eds.; Academic Press: New York; p. 150 (1978).

C. Rauwendaal, "Coextrusion" in *Polymer Extrusion;* Hanser Publishers: Munich; pp. 453–456 (1986).

W. J. Schrenk, "Flow Problems in Multilayer Coextrusion", *Coextrusion*, pp. 27–34, presented at the Society of Plastics Engineers Chicago Section Regional Technical Conference, Oak Brook, IL (Jun. 20–22, 1977).

Encyclopedia of Polymer Science & Engineering, vol. 13, pp. 345–368, Wiley–Interscience Publishers (New York, 1988).

Encyclopedia of Polymer Science & Technology, vol. 1, pp. 371–405, Wiley–Interscience Publishers (New York, 1964).

*Primary Examiner*—Jeffery R. Thurlow
*Attorney, Agent, or Firm*—Gary L. Griswold; Walter N. Kirn; James V. Lilly

[57] ABSTRACT

A method utilizing melt processing for making a unified, composite tape structure that includes two outer pressure-sensitive adhesive layers and a backing wherein at least one of the two outer adhesive layers is not mutually coextensive.

20 Claims, 2 Drawing Sheets

U.S. PATENT DOCUMENTS

| | | | |
|---|---|---|---|
| 4,080,348 | 5/1978 | Korpman | 260/27 BB |
| 4,136,071 | 1/1979 | Korpman | 260/27 BB |
| 4,152,387 | 5/1979 | Cloeren | 264/171 |
| 4,197,069 | 4/1980 | Cloeren | 425/131.1 |
| 4,206,165 | 6/1980 | Dukess | 264/45.9 |
| 4,214,261 | 7/1980 | Bazin et al. | 358/19 |
| 4,244,914 | 1/1981 | Ranalli et al. | 264/515 |
| 4,336,012 | 6/1982 | Koch et al. | 425/462 |
| 4,339,485 | 7/1982 | Shibano et al. | 428/40 |
| 4,379,806 | 4/1983 | Korpman | 156/244.11 |
| 4,425,176 | 1/1984 | Shibano et al. | 156/244.11 |
| 4,438,171 | 3/1984 | Wefer | 428/215 |
| 4,451,533 | 5/1984 | Wong et al. | 264/288.4 |
| 4,496,617 | 1/1985 | Parker | 156/908 |
| 4,600,550 | 7/1986 | Clören | 264/171 |
| 4,611,987 | 9/1986 | Hahn et al. | 425/131.1 |
| 4,619,799 | 10/1986 | Teerling | 264/101 |
| 4,619,802 | 10/1986 | Cloeren | 264/171 |
| 4,693,858 | 9/1987 | Volke | 264/101 |
| 4,699,816 | 10/1987 | Galli | 156/244.11 |
| 4,713,273 | 12/1987 | Freedman | 428/40 |
| 4,725,468 | 2/1988 | McIntyre | 156/244.11 |
| 4,780,258 | 10/1988 | Cloeren | 264/171 |
| 4,789,513 | 12/1988 | Cloeren | 264/171 |
| 4,792,584 | 12/1988 | Shiraki et al. | 524/77 |
| 4,833,179 | 5/1989 | Young et al. | 522/183 |
| 4,837,088 | 6/1989 | Freedman | 156/244.11 |
| 4,839,206 | 6/1989 | Waldenberger | 428/40 |
| 4,888,075 | 12/1989 | Freedman | 156/243 |
| 4,889,669 | 12/1989 | Suzuki | 264/45.9 |
| 4,906,421 | 3/1990 | Plamthottam et al. | 264/101 |
| 4,923,551 | 5/1990 | Wagers et al. | 156/244.11 |
| 4,946,532 | 8/1990 | Freeman | 156/243 |
| 4,952,650 | 8/1990 | Young et al. | 526/194 |
| 5,045,264 | 9/1991 | Kirksey | 425/462 |
| 5,047,196 | 9/1991 | Zuckerberg et al. | 156/244.11 |
| 5,069,969 | 12/1991 | McClintock et al. | 428/36.5 |
| 5,129,772 | 7/1992 | Slautterback | 156/908 |
| 5,173,141 | 12/1992 | Leseman et al. | 264/171.13 |
| 5,242,516 | 9/1993 | Custer et al. | 156/244.11 |

METHOD OF MAKING DOUBLE-SIDED PRESSURE-SENSITIVE ADHESIVE TAPE

CROSS-REFERENCE TO RELATED APPLICATION

This application is a division of U.S. application Ser. No. 08/166,549, filed Dec. 14, 1993, which is a continuation-in-part of U.S. application Ser. No. 07/769,548, filed Oct. 1, 1991 both now abandoned.

FIELD OF THE INVENTION

The present invention relates to a coextruded double-sided pressure-sensitive adhesive tape and to a solventless method for making these tapes.

BACKGROUND OF THE INVENTION

Double-sided pressure-sensitive adhesive tapes are known. Typically they comprise two adhesive layers adhered to opposite sides of a backing which may itself comprise several layers of material.

Several techniques for the manufacture of composite pressure-sensitive adhesive tapes are also known. One technique comprises a multistep solvent coating process. Another comprises a multistep hot melt coating process. In each of these techniques the individual layers that make up the composite tape are applied sequentially. Consequently, the techniques are time consuming and labor intensive. Solvent coating processes further necessitate the use of special handling and equipment so as to minimize hazards to workers and the environment. Both processes subject the tape to severe operating conditions during its manufacture (for example elevated temperature, solvent atmosphere, etc.), thus necessitating use of non-extensible, tear-resistant, heat-resistant, and/or water resistant backing materials so as to withstand the rigors of the manufacturing process. However, this tends to limit the use of polymeric materials as the backing material to those that are oriented and/or are sufficiently thick to withstand the rigors of the manufacturing process.

An attempt to reduce the number of steps in the process involves the use of coextrusion. Such techniques are described in a number of publications. For example, U.S. Pat. No. 3,415,920 (Lee et al.) discloses the manufacture of a polyolefin-encapsulated adhesive fiber by the coextrusion of an adhesive and an outer skin of polyolefin. Japanese Patent Publication No. JP-46-21120 (Hori et al.) discloses a process for the melt extrusion of a stream of thermoplastic synthetic resin and a stream of an adhesive, guiding the two streams of resin through a single die to form a single fluid flow having separate layers made up of each stream, and forming a tape having adhesive on one side. U.S. Pat. No. 3,823,211 (Colombo) discloses a method of coextruding a synthetic foam/synthetic resin backing construction.

It is also known that a multilayer polypropylene film can be prepared by coextrusion and that an adhesive can be subsequently coated onto the multilayer film.

U.S. Pat. No. 4,379,806 (Korpman) discloses producing a two-layer pressure-sensitive adhesive tape. In one process a tacky, thermoplastic rubber/resin pressure-sensitive adhesive and a backing of a normally non-tacky thermoplastic resin are coextruded to provide a tape having adhesive on only one side. In another method a blown layered film of the backing and adhesive is extruded. The film is then collapsed so that the backing film is joined to itself. The adhesive and the backing each have a torque value of between about 100 meter grams and 1000 meter grams when worked at 74 revolutions/minute (RPM) at 420° F. in a Brabender torque dynamometer. Additionally, the adhesive is joined to the backing "through an intermediate interlocking layer formed by controlled penetration of components during coextrusion of the film-forming and the adhesive compositions" (column 2, lines 3–7).

U.S. Pat. No. 4,888,075 (Freedman) discloses an all plastic multilayer liner and facestock for pressure-sensitive labels, tapes, etc. and a method of making such liners and facestocks. The liner/facestock is coextruded from any suitable coextrusion die such as, for example, a Cloeren "vane" die (column 2, lines 56–61). The pressure-sensitive adhesive is subsequently applied to the liner/facestock either by adhesive transfer from a release liner (column 6, lines 14–22), or in a subsequent coating step (column 6, lines 23–29 and FIG. 3A).

European Patent Application Publication No. 0 411 820 A1 (Wood et al.) discloses a reinforced pressure-sensitive adhesive tape and a method of making the same. The tape comprises a backing having a plurality of ribs at least partially embedded in one of its major surfaces. A pressure-sensitive adhesive is provided on at least one surface of the backing. The backing and reinforcing ribs can be coextruded together followed by application of the adhesive.

There have also been attempts to coextrude multilayer two-sided adhesive tapes directly into a nip formed between two solid surfaces. This technique has not been entirely satisfactory as the pressure on the extrudate while it is in the nip causes the adhesive to aggressively adhere to one of the surfaces. Once adhered, it is difficult to remove the adhesive.

While the tapes of these prior efforts are useful, their manufacture and conversion into an adhesive tape generally involves a series of sequential operations or extra handling which add to the cost and complexity of their preparation. The tapes disclosed in the above-mentioned publications have adhesive on only one side. To the extent that they disclose a tape having adhesive on both sides, they do so only through a multi-step process, rather than one in which the entire tape is produced via a single melt processing step.

Adhesive tapes with pressure-sensitive adhesive layers on two sides, typically with a backing between the adhesive layers, typically referred to as double-sided adhesive tapes, have been known. Typically the adhesive layers are substantially coextensive. In some instances, however, while one adhesive layer is coextensive with the backing the other adhesive layer is smaller such that a portion of the backing is exposed. In this manner the backing provides finger tab. Such tapes have been used as closures on diapers and personal hygiene articles. Such tapes are manufactured through sequential coating processes and so-called "zone coating" techniques.

SUMMARY OF THE INVENTION

The present invention provides a novel composite, unified pressure-sensitive adhesive tape and a novel method for making such tapes.

Briefly summarizing, composite tapes of the invention comprise a backing with first and second major surfaces, a first layer of normally tacky pressure-sensitive adhesive on the first major surface, and a second layer of normally tacky pressure-sensitive adhesive on the second major surface. The adhesive layers and backing were simultaneously coextruded. At least one of the backing and adhesive layers is not mutually coextensive and is sometimes referred to herein as "non-coextensive". In other words, at least one of the backing and adhesive layers is discontinuous in the transverse direction so as to render the component members of the composite "non-coextensive". As used herein, "discontinuous in the transverse direction" means the subject layer has a longitudinal (i.e., machine direction) channel or gap along in an area where the adjacent backing or other adhesive layer extends. The channel(s) may be located along the outer edge of the layer and/or may be located within the interior portions of the layer as desired. The tape of the invention is sometimes referred to herein as a "double sided" tape to indicate the presence of adhesive on both exterior surfaces.

Composite tapes of the invention are, in brief summary, made by the steps of:

a) providing first and second molten streams of pressure-sensitive adhesive composition(s);

b) providing a third molten stream of backing-forming material;

c) combining the streams to provide a single unified, molten composite structure having, in order, a first layer of pressure-sensitive adhesive composition, a layer of backing-forming material, and a second layer of pressure-sensitive adhesive composition, wherein at least one of the backing and the layers of adhesive composition is transversely discontinuous so as to be non-coextensive with one or both of the other two; and d) cooling the molten structure to yield the composite tape.

Typically, the combined streams are deposited onto a support surface or carrier and cooled to form the composite tape. Typically, the molten streams are simultaneously melt processed and deposited on a support surface without passing the molten composite through a nip. Thus one surface of the molten composite contacts the support while the other is free, that is it does not contact another solid surface. In this embodiment of the invention, the adhesion problems due to nipping the molten structure are avoided. Preferably the support surface employed in this novel process comprises a release liner. In this case, the opposite face of the support surface may then be contacted with a cooling means maintained at a temperature less than the melt temperature of the composite structure. The tape is preferably cooled after which it may, as desired, be nipped, wound upon itself, slit, and/or cut to any desired width and/or length.

Because the carrier layer is simultaneously melt processed during the manufacture of the composite tape, it is not limited to any particular thickness. Thus, it can be a very thin layer (e.g., typically at least 8 micrometers or more) if so desired.

The present invention offers several unique features. For example,

It provides a composite, unified tape having pressure-sensitive adhesive on both sides wherein the adhesive layers and backing have been simultaneously joined via melt processing.

It allows one to provide a composite, unified double sided tape having a desired backing between the adhesive layers.

It allows one to readily produce a tape having desired properties (e.g. hand tearability or dispensibility) by simply varying the nature and quantity of the components employed, and/or the process conditions employed.

It provides a single step, solvent-free manufacturing process thereby eliminating the various handling, processing, and solvent recovery steps encountered with the multistep processes described above.

It provides an integrated process in which raw materials are charged at one end and a finished product is obtained at the other end.

BRIEF DESCRIPTION OF THE DRAWINGS

The invention will be further explained with reference to the drawing, wherein.

These figures, which are idealized, are not to scale and are intended to be merely illustrative and non-limiting.

DETAILED DESCRIPTION

The tape of the invention comprises at least two adhesive layers and a backing wherein the backing and adhesive layers were simultaneously joined together to form a unified composite structure by melt processing.

Figure 1:
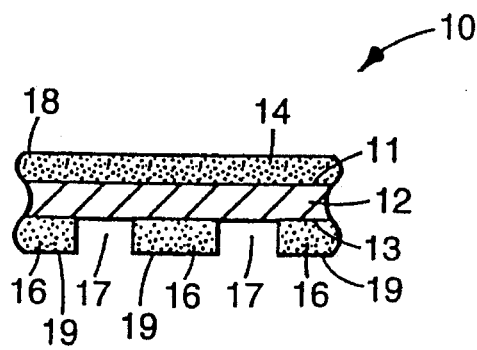
FIG. 1 shows a cross-section, transverse to the machine direction of when the tape is made, of a portion of one embodiment of a tape of the invention.

Tapes of the invention can be provided in several embodiments. For example, as shown in FIG. 1 tape 10 can comprise backing 12 with first adhesive layer 14 on surface 11 and second adhesive layer 16 on major surface 13. Second adhesive layer 16 has longitudinal channels 17 and is non-coextensive with first adhesive layer 14 and backing 12. Tape 10 may be slit in machine direction along longitudinal channels 17 to form finger tabs. As will be understood, tape 10 may be slit anywhere (e.g., in the center, along the edge, etc.) along longitudinal channels 17 as desired to yield strips of tape with edges of backing exposed that can be wound into roll form if desired. The resultant strips can be cut in the cross-direction to form tape tabs in which the exposed portions of backing 12 can function as finger tabs.

Figure 2:
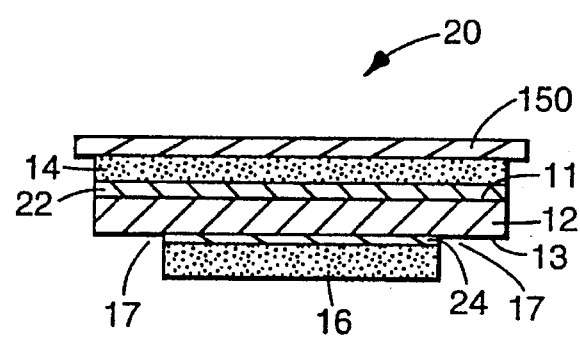
FIG. 2 shows a cross-section, transverse to the machine direction of when the tape is made, of another embodiment of a tape of the invention.

FIG. 2 represents another embodiment wherein tape 20, shown on removable liner 150, comprises backing 12, first adhesive layer 14, and second adhesive layer 16. Major surface 11 of backing 12 is covered with optional intermediate layer 22, e.g., a tie layer, and major surface 13 is covered with optional intermediate layer 24. In the embodiment shown, adhesive layer 16 is non-coextensive with backing 12 so as to provide longitudinal channels 17 along the sides of tape 20. By slitting tape 20 in the middle of adhesive layer 16, two tapes with finger tabs along one side are provided. If desired, the resultant tapes may be cut in cross-direction to yield tape strips with a finger tab at one end.

Additionally in each embodiment, each adhesive utilized may be the same as, or different than, the other(s). The use of a common adhesive as the adhesive layers results in a tape having essentially the same tack and adhesion properties on both sides. If, however, a tape which has differential tack and/or adhesion is desired, different adhesive materials may be employed.

It is noted that the tape of the invention can employ a plurality of adjoining adhesive layers on one or both sides of the backing such as is shown by layers 22/14 and 24/16 in FIG. 2. This construction permits flexibility in the design and construction of the tape and allows one to provide a tape having, for example, a high tack surface over a high shear adhesive. While this discussion has been made with reference to the adhesive tape of FIG. 2, it is understood that any embodiment of the invention may employ multiple adhesive layers. It is further understood that the backing of the various embodiments may also be provided as multiple layers if desired.

It should also be noted that any of the layers of the tape of the invention can be of the same or different thickness as the other layers. While the precise thickness of these layers is not crucial to the invention, they are commonly at least 1 micrometer thick.

Pressure-sensitive adhesives useful in the invention include normally tacky, pressure-sensitive adhesives known in the art. Such adhesives may be foamed adhesives if desired. The adhesives useful herein are extrudable and typically, though not necessarily, amorphous. Furthermore, the preferred adhesives are normally tacky (at room temperature) pressure-sensitive adhesives.

Useful pressure-sensitive adhesive compositions are fluid or pumpable at the temperatures used to melt process the tape (e.g., typically 90° C. to 300° C.). Furthermore these adhesive compositions preferably do not significantly degrade or gel at the temperatures employed during melt processing. Useful adhesive compositions also typically have a melt viscosity of from 1 poise to 100,000 poise. As used herein, the term melt viscosity means the viscosity of the molten material at the processing temperature employed. The adhesives may generally be classified into the following categories:

Random Copolymer adhesives such as those based upon acrylate and/or methacrylate copolymers, α-olefin copolymers, silicone copolymers, chloroprene/acrylonitrile copolymers, and the like.

Block Copolymer adhesives including those based upon linear block copolymers (i.e., A-B and A-B-A type), star block copolymers, comb block copolymers, and the like.

Natural rubber adhesives. A description of useful pressure-sensitive adhesives may be found in *Encyclopedia of Polymer Science and Engineering*, Vol. 13, Wiley-Interscience Publishers (New York, 1988). Additional description of useful pressure-sensitive adhesives may be found in *Encyclopedia of Polymer Science and Technology*, Vol. 1, Interscience Publishers (New York, 1964). Other pressure-sensitive adhesives useful in the invention are described in the patent literature. Examples of these patents include U.S. Pat. Nos. Re 24,906 (Ulrich), 3,389,827 (Abere et al. at column 4–5), 4,080,348 (Korpman), 4,136,071 (Korpman), 4,792,584 (Shiraki et al.), 4,833,179 (Young et al.), and 4,952,650 (Young et al.).

Commercially available pressure-sensitive adhesives are also useful in the invention. Examples of these adhesives include the hot melt pressure-sensitive adhesives available from H. B. Fuller Company, St. Paul, Minn., as HM-1597, HL-2207-X, HL-2115X, and HL-2193-X. Other useful commercially available pressure-sensitive adhesives include those available from Century Adhesives Corporation, Columbus, Ohio.

Backings useful in the present invention comprise extrudable polymeric materials. Useful backings are fluid or pumpable at the temperatures used to melt process the tape; they do not significantly degrade at such temperatures; and they have a melt viscosity in the range of from 1 poise to 100,000 poise.

The backing layer may be of any desired thickness from very thin, e.g., about 1 micrometer, to very thick, e.g, about 500 micrometers or more. In cases where the backing is used to generate a finger tab in a finished closure tape it is preferably about 8 to 12 micrometers in thickness.

Numerous organic materials are useful as the backing. Examples of these materials include polyolefins (including by Way of example linear low density polyethylene, ultra low density polyethylene, low, medium, and high density polyethylene, polypropylene, foamed polyolefins, copolymers of polypropylene and ethylene, and blends of polyolefins (including polypropylene/polyethylene blends and polypropylene/polystyrene blends)), polyurethanes, foamed polyurethanes, polystyrene and foamed polystyrene, vinyl materials (including by way of example ethylene vinyl acetate, polyvinylidene dichloride, and polyvinylchloride), polyesters, polymethyl methacrylate, and block copolymers (including by way of example A-B and A-B-A block copolymers). Blends and mixtures of these materials may also be utilized as the backing.

The tape of the invention may also incorporate one or more intermediate layers between the backing and the adhesive layer(s). The intermediate layer may comprise one of the materials useful as the backing. Typically it is thinner than the backing, although there is no absolute requirement that it be so. Thus, the intermediate layer may have a thickness in the range of from 1 to 500 micrometers, typically from 1 to 5 micrometers. These materials must meet the same melt processing criteria as the backing materials to be useful herein.

Specific examples of materials useful as the intermediate layer include ethylene/vinyl acetate copolymer (preferably containing at least about 10 percent by weight vinyl acetate units), carboxylated ethylene/vinyl acetate copolymer such as CXA™ 3101 available from DuPont, copolymers of ethylene and methyl acrylate such as POLY-ETH™ 2205 EMA available from Gulf Oil and Chemicals Co., ethylene/acrylic acid copolymer available from Dow Chemical Company, SURLYN™ (a copolymer of ethylene with a methyl acrylate) available from DuPont, maleic anhydride modified polyolefins, and copolymers of polyolefins such as the MODIC™ resins available from Mitsubishi Chemical Company, polyolefins containing homogeneously dispersed vinyl polymers such as the VMX™ resins available from Mitsubishi Chemical Company (such as FN-70, an ethylene/vinyl acetate based product having a total vinyl acetate content of 50 percent, and JN-70, an ethylene/vinyl acetate based product containing dispersed polymethylmethacrylate and having a vinyl acetate content of 23 percent and a methyl methacrylate content of 23 percent), POLYBOND™ (believed to be polyolefin grafted with acrylic acid) available from B. P. Chemicals Inc., PLEXAR™ (believed to be a polyolefin grafted with polar functional groups) available from Quantum Chemicals, Inc., a copolymer of ethylene and acrylic acid such as PRIMACOR™ available from Dow Chemical Company, and a copolymer of ethylene and methacrylic acid such as NUCREL™ available from DuPont. If desired, the intermediate layer materials may be employed to form the backing.

Inorganic materials may be employed in the backing, in one or both of the adhesive layers, and/or intermediate layer(s), if any, if desired. Examples of useful inorganic materials include calcium carbonate, titanium dioxide, glass beads or bubbles, polymeric beads or bubbles, metals particles, flame retardants, fibers, pigments, etc.

If desired, a low adhesion backsize (LAB) can be melt processed into or onto one or both of exterior adhesive surfaces 18 and 19. The resulting construction will still exhibit pressure-sensitive properties although they may be somewhat less than if no LAB were employed. In order to be melt processable, however, the LAB must be extrudable under the conditions employed during manufacture of the tape. It is also possible, however, to apply the LAB via conventional coating techniques after the tape has been coextruded. LAB materials useful herein include polyolefins, cured silicones, polymethyl pentene, poly 1-octene, blends of silicones with polyethylene, blends of fluorochemicals with polypropylene, polyethylene, polyurethanes, or fluorochemicals grafted to polyolefins or similar polymers and the like.

Illustrative examples of suitable LAB materials are described in the literature. See for example, U.S. Pat. Nos. 2,532,011 (Dahlquist et al.); 2,607,711 (Hendricks); and 3,318,852 (Dixon).

In each embodiment, the adhesive layers, the backing layer, and any intermediate layer(s) are simultaneously melt processed. As used herein, "melt processing" means the pumping and shaping of molten material into a structure. One melt processing technique useful in the present invention is coextrusion. As used herein, "coextrusion" refers to the simultaneous melt processing of multiple molten streams and combination of the molten streams into a single unified structure before the streams are cooled. Preferably the molten streams are extruded from a single extrusion die.

Tapes of the invention are made of at least three layers, i.e., the backing layer with at least two adhesive layers on opposing sides thereof, wherein at least one of the backing and adhesive layers is not coextensive with the other two. An adhesive stream that is not coextensive with the backing is typically joined to the stream of backing-forming material in the die or at the die exit. If the other adhesive stream is to be coextensive with the backing, its stream can be joined to the stream of backing-forming material in a feedblock, in the die, or at the die exit. If the streams are joined in the die, they can come together upstream of the exit orifice (sometimes referred to as a "common land die") or at the exit orifice (sometimes referred to as a "zero common land die"). In all cases, however, the molten streams are joined together in proximity to the outlet of the die.

The tape of the invention may be made by a melt processing technique in which at least one non-coextensive molten stream of pressure-sensitive adhesive composition and a backing-forming material, and optionally streams of other melt processable materials are combined together, preferably in proximity to the outlet of an extrusion die, so as to form a unified structure. Molten streams of other materials may also be advantageously combined with the adhesive streams in the practice of the invention. In a novel of the melt processing technique, the tape is made by:

a) providing first and second molten streams of pressure-sensitive adhesive composition(s); b) providing a third molten stream of backing-forming material;

c) combining the streams to provide a unified, molten, composite structure having, in order, a first layer of pressure-sensitive adhesive composition, a layer of backing-forming material, and a second layer of the pressure-sensitive adhesive composition; and d) cooling the molten structure to yield the composite tape.

Typically, the combined streams are deposited onto one face of a support surface and cooled to form the composite tape before the passing through a nip.

Figure 3:
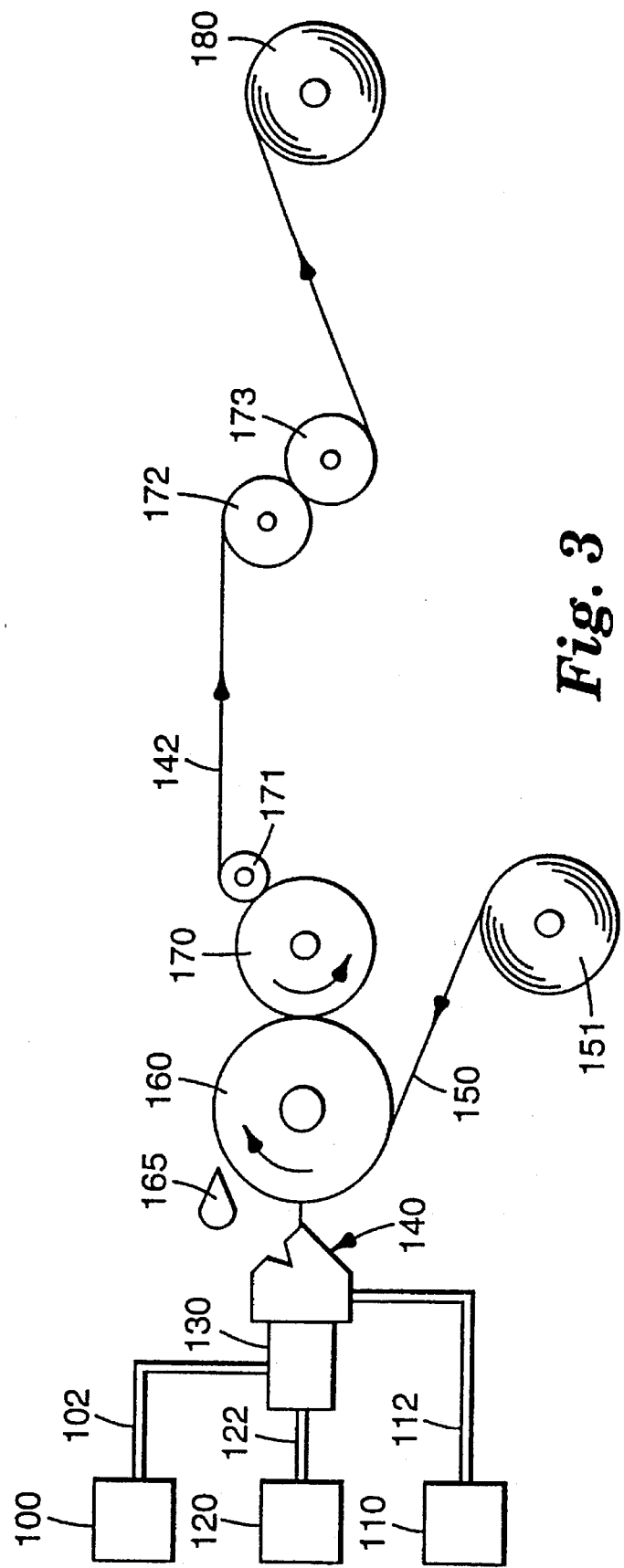
FIG. 3 shows a schematic diagram of a system used to manufacture tape of the invention.

Preferably, the tape is manufactured using a coextrusion technique in which the various molten streams are transported to an extrusion die outlet and joined together in the proximity of said outlet. A coextrusion technique useful in the invention is schematically shown in FIG. 3 wherein the backing and one adhesive layer are to be coextensive. With reference to FIG. 3, extruders 100, 110, and 120 are shown. Extruders 100 and 110 provide molten streams of 102 and 112 of first and second pressure-sensitive adhesive compositions to a feedblock 130 and manifold 140, respectively. Extruder 120 provides a molten stream 122 of backing-forming material to feedblock 130. It is further understood that only one extruder can be used to deliver the pressure sensitive adhesive composition to the feedblock if desired, e.g., where the adhesive layers have the same composition. In the event that only one extruder is employed, the melt stream is split into the number of streams (e.g., two or more) of the adhesive to be utilized in the tape.

Feedblock 130 combines the molten streams into a single flow channel and is well suited for use in coextruding coextensive streams. The distinct layers of each material are maintained at this time because of the laminar flow characteristics of the streams. Preferably the ratio of the melt viscosity of any material used as a layer herein to the melt viscosity of any other material used as a layer herein is in the range of from 10:1 to 1:10, more preferably in the range of 3:1 to 1:3, and most preferably in the range of 2:1 to 1:2. It has been found that as the ratio of the melt viscosity changes from a ratio of 1:1, the lower viscosity material has a tendency to migrate to the high shear portion of the extrusion die and create an area rich in that material. The feedblock delivers or transports the now unified, molten structure to the extrusion die 140 where it is reduced in height and increased in width so as to provide a relatively thin and wide construction and combined with the non-coextensive adhesive stream.

Extruders 100, 110 and 120 are in effect "pumps" for delivery of the molten streams to the extrusion die. The precise extruder employed is not critical to the process. However, it is understood that the design of the extruder screw will influence the ability of the extruder to provide good melt quality, temperature uniformity, throughput, and the like. A number of useful extruders are known and include single and twin screw extruders, batch-off extruders, and the like. These extruders are available from a variety of vendors including Davis-Standard Extruders, Inc. (Pawcatuck, Conn.), Black Clawson Company (Fulton, N.Y.), Berstorff Corp (North Carolina), Farrel Corporation (Connecticut), and Moriyama Mfg. Works, Ltd. (Osaka, Japan).

Other "pumps" may also be employed to deliver the molten streams to the extrusion die. They include drum unloaders, bulk melters, gear pumps, etc. These are available from a variety of vendors, including Graco LTI (Monterey, Calif.), Nordson (Westlake, Calif.), Industrial Machine Manufacturing (Richmond, Va.), Zenith Pumps Division, Parker Hannifin Corporation, (North Carolina).

Once the molten streams have exited the pump, they are typically transported to the die through transfer tubing and/or hoses. It is preferable to minimize the amount of residence time in the tubing so as to avoid problems of, for example, melt temperature variations. This can be accomplished by a variety of techniques, including minimizing the length of the tubing, providing appropriate temperature control of the tubing, and utilizing static mixers in the tubing to maintain a homogeneous temperature in the tubing.

The use of a feedblock is optional as a variety of coextrusion die systems are known. Thus, for example, multimanifold dies may also be employed. Examples of feedblocks and extrusion dies useful in the invention are the Cloeren "vane" dies and Cloeren coextrusion feedblocks and multimanifold dies available commercially from The Cloeren Company of Orange, Tex. Such dies are described in, for example, U.S. Pat. Nos. 4,152,387; 4,197,069; 4,600,550; 4,619,802; 4,780,258; and 4,789,513 (all Cloeren). Other coextrusion dies and feedblocks are available from Extrusion Dies, Inc. (Chippewa Falls, Wis.), ER-WE-PA (GA), Egan Machinery Division, John Brown Inc. (New Jersey), and Welex Inc. (Pennsylvania).

The selection of the feedblock and/or extrusion die to be utilized is not critical to the practice of the process. However, it is noted that certain factors do influence the performance of the extrusion process. For example, because feedblocks require materials to flow in contact through a single manifold after the point of confluence, the relative viscosities of the materials and their ability to be processed at a single manifold temperature must be considered. When the relative viscosities of the materials exceed 4:1 or when a single manifold temperature cannot be tolerated by the materials, multimanifold dies are typically employed. In multimanifold dies, each material flows in its own manifold to the point of confluence. Each individual manifold can be designed specifically for the rheology of each resin. Also each manifold can be controlled at a different process temperature.

Multimanifold dies can also be designed with zero common land length so that the materials do not meet until the die lip or exit orifice. Alternatively they can be designed with a short common flow channel. A zero common land would be preferred when molten streams with extreme viscosity differences (e.g., ratio of 400:1 +) are employed. For more moderate viscosity differences (e.g., ratio of 10:1 or less), a short common land can be beneficial because the period of high temperature and high pressure while the melts are in the common land can improve the bond strength between the layers of the composite tape.

Figure 4:
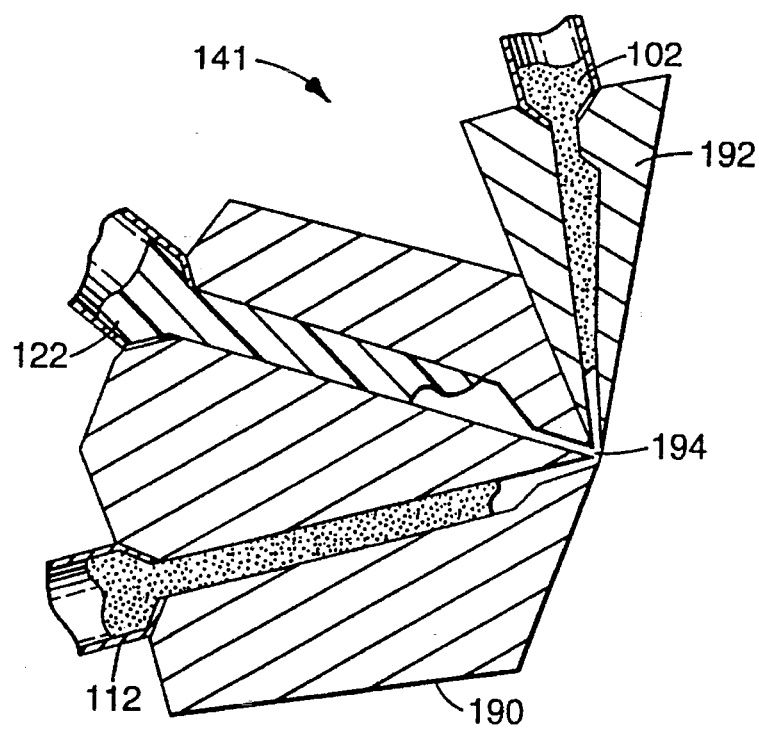
FIG. 4 shows a cross section parallel to machine direction of a die assembly which can be used to make tapes in accordance with the invention.

FIG. 4 shows an illustrative embodiment of a multimanifold die 141 that can be used in the process of the invention to make tapes of the invention. Multimanifold die 141 is made up of two manifold die 190 through which adhesive stream 112 and backing forming stream 122 pass, and one manifold die 192 through which adhesive stream 102 passes. As shown, die 141 has no common land length, i.e., the materials do not meet until die orifice 194.

Extrusion die 141 deposits the unified, molten structure onto a solid substrate (here indicated as a release liner 150) supplied from roll 151 so that the first surface of the structure is in contact with the liner (a solid substrate) while the second surface of the structure is a free surface (i.e., it is not in contact with any other solid surface). Tape 142 results. Liner 150 contacts the surface of casting wheel 160 and is interposed between the surface of the casting wheel and the molten stream. However, the use of liner 150 in the process is optional. Thus, the molten structure can be deposited directly onto the surface of casting wheel 160. The liner can be subsequently applied to one surface of the tape of the invention later in the process, for example at nip roll 170.

The casting wheel is typically maintained at a temperature less than the temperature of the unified molten structure. Typically this is a temperature in the range of from 5° to 150° C. (preferably from 30° to 105° C.).

When a tape such as that illustrated in FIG. 1 is made, adhesive layers 16 and 18 blanket backing layer 12. This enables one to make a tape with a carrier which has a tailored thermal history and, accordingly, various selected physical properties as a result of that thermal history. Applicants are unaware of any other tape or method of making the same which provides this feature.

It has been found that for certain backing materials, such as polypropylene, cooling and solidifying the molten structure slowly results in an embrittled backing. Tapes made in this manner are hand tearable. If, however, the unified molten structure is cooled and solidified rapidly, a more ductile backing results. Tapes made in this manner have high elongation at break and stretch significantly when hand torn.

An air knife 165 may be used to force the molten unified structure against liner 150 if desired.

The unified structure is then "nipped" between casting wheel 160 and nip roll 170. If desired, the unified structure can then pass through a series of rolls 171, 172, 173 and then can be wound as roll 180. Alternatively, the tape can be removed from the liner and wound upon itself as roll 180. The liner can be recovered and reused if desired. Desired widths and/or lengths of the tape can then be cut using techniques known to the art.

A number of additional steps can optionally be performed if desired. Thus, for example, the tape may be uniaxially or biaxially oriented, it can be post cured (such as through heat, electromagnetic radiation, etc.), or it can be dusted with various tack-reducing agents. Furthermore, LAB coatings can also be applied at this point.

EXAMPLES

The invention will be further explained by the following illustrative examples which are intended to be nonlimiting. Unless otherwise indicated, all amounts are expressed in parts by weight.

Unless otherwise indicated, the following test methods were used. In these examples, the tapes described were characterized by the following test methods:

ASTM-D3330 for tape peel adhesion to stainless steel (SS) and polypropylene (PP) at 90° and 180° peel angles and for tape liner release.

ASTM-D3654 for shear failure of a 2.54 centimeter (cm) by 2.54 cm (1 inch×1 inch) sample both at room temperature and at elevated temperatures.

ASTM-D412 for tensile elongation at break.

EXAMPLE 1

A coextruded pressure-sensitive adhesive tape according to the invention was prepared using a three manifold extrusion die. The internal flow channels were comprised of an inlet channel, a primary manifold, and a final land. The die had a manually adjusted flexible lip and two independently controlled temperature zones, one in each die half. The die orifice for Adhesive A was 25.4 centimeters ("cm") (10 inches "in") wide and the die orifice for backing-forming material was 30.5 cm (12 in). Both orifices were cut to a height of about 0.38 millimeter ("mm") (0.015 in). The die included three inlet ports and three manifolds. For this example, an ABC construction was produced where A was a continuous adhesive layer, B was the backing, and C was a non-continuous adhesive layer, i.e., longitudinal strips with longitudinal gaps therebetween.

Fitted to the "A" inlet was a transfer tube from a hot-melt KRATON™ adhesive remelt processing apparatus. This was comprised of a drum melter fitted with a hot-melt synthetic rubber PSA apparatus. A drum unloader, designed and fabricated by Graco LTI (Monterey, Calif.), was used to remelt and pump a precompounded synthetic rubber PSA comprised of 100 parts by weight Shell KRATON™ 1107 copolymer and 77 parts by weight WINGTACK™ tackifier. The drum unloader had a heated platen and integral gear pump to melt and pump the PSA formulation. This melt stream was fed to two gear pumps to provide adhesive streams A and C. Stream A was pumped by a pump with capacity of 10 centimeters$^3$revolution and Stream B was pumped by a pump with a capacity of 5.5 centimeters$^3$/revolution.

Fitted to the "B" inlet of the die was a transfer tube from a 3.175 cm (1.25 in.) diameter single screw extruder (available from Killion Extruders, Inc., Cedar Grove, N.J.) for processing the carrier resin. This extruder used a single stage, single flight, to process the TENITE™ polypropylene resin from Tennessee Eastman used in this example. This extruder barrel was electrically heated and air cooled.

The above extrusion apparatus was operated at the following temperatures and speeds:

Die temperature=166° C. (330° F.)

Gear pump temperature=166° C. (330° F.)

PSA drum unloader temperature=166° C. (330° F.)

Backing temperature=21° C. (70° F.)

Transfer tubes temperature=166° C. (330° F.)

Backing extruder screw speed setting=50 revolutions/minute ("rpm")

Adhesive A gear pump speed=5.5 rpm

Adhesive B gear pump speed=7 rpm

The three manifold die was mounted in an approximately horizontal attitude with the die orifice within 3.0 cm (1.2 in) of the surface of a chrome plated steel casting wheel (Roll 160). A silicone coated paper liner was unwound onto Roll 160 so as to make contact with the roll surface approximately one quarter of the roll circumference before the die orifice. As the liner moved past the orifice, being driven by Roll 160, the composite melt was laid onto the liner. This step was aided by electrostatic pinning to minimize the entrapment of air between the melt and the incoming liner. The temperature of Roll 160 was controlled by circulating water through the roll's interior. Roll A was 30.5 cm (12 in.) in diameter. The nip roll (Roll 170) acted as a nip on the web to isolate the web tension from subsequent web handling steps. Roll 170 was 30.5 cm (12 in.) in diameter and was covered with 1.3 cm (0.5 in.) silicone rubber. Roll 170 was also temperature controlled by circulating water through its interior.

The web handling apparatus in Example 1 was operated at the following temperatures and speeds:

Web line speed: 8 meters per minute (26 feet per minute)

The finished tape had 2.5 cm (1 in) wide strips of Adhesive B separated by 1.0 cm (0.4 in) longitudinal gaps.

Various modifications and alterations of this invention will become apparent to those skilled in the art without departing from the scope and spirit of this invention.

What is claimed is:

1. A solvent-free method for the manufacture of pressure-sensitive adhesive tape comprising the steps of:

(a) providing first and second solvent-free pressure-sensitive adhesive compositions and forming molten streams thereof;

(b) providing a solvent-free backing-forming material and forming a molten stream thereof;

(c) combining said streams into a single unified molten structure having a first layer of pressure-sensitive adhesive composition formed from said first molten stream of pressure-sensitive adhesive composition, a second layer of pressure-sensitive adhesive composition formed from said second molten stream of pressure-sensitive adhesive composition, and a layer of backing-forming material disposed between said pressure-sensitive adhesive layers, wherein at least one of said layers of adhesive is not coextensive; and (d) cooling said molten structure to yield a composite pressure-sensitive adhesive tape comprising a backing with first and second major surfaces formed from said backing-forming material, a first layer of normally tacky pressure-sensitive adhesive formed from said first layer of pressure-sensitive adhesive composition on said first major surface, and a second layer of normally tacky pressure-sensitive adhesive formed from said second layer of pressure-sensitive adhesive composition on said second major surface, wherein at least one of said layers of adhesive is non-coextensive.

2. The method of claim 1 wherein step (c) includes transporting said streams to an extrusion die outlet and joining said streams in the proximity thereof to yield said unified molten structure.

3. The method of claim 1 further comprising depositing said unified molten structure onto a solid carrier.

4. The method of claim 3 wherein said carrier is maintained at a temperature less than the melt temperature of any of said molten streams.

5. The method of claim 3 wherein said carrier comprises a flexible release liner.

6. The method of claim 5 wherein said composite adhesive tape is wound into roll form with said release liner.

7. The method of claim 5 comprising the further step:

e) removing said release liner after cooling said molten structure.

8. The method of claim 1 wherein said backing is discontinuous.

9. The method of claim 1 further comprising winding said composite adhesive tape into roll form.

10. The method of claim 1 wherein said first and second pressure-sensitive adhesive layers exhibit different room temperature tack after being solidified.

11. The method of claim 1 comprising the further step of crosslinking at least one of said adhesive layers.

12. The method of claim 1 further comprising slitting said cooled structure.

13. The method of claim 9 wherein said composite adhesive tape is wound into roll form and at least one of said layers of adhesive is non-coextensive such that at least one discontinuity extends longitudinally along the length of said tape.

14. The method of claim 1 wherein at least one of said adhesive layers is discontinuous along at least one side of said unified molten structure such that said unified molten structure has longitudinal channels, and wherein said method further comprises:

(e) cutting said composite adhesive tape in cross-direction relative to the length of the tape.

15. The method of claim 1 wherein said backing is nonadhesive.

16. The method of claim 1 wherein at least one of said pressure-sensitive adhesive layers further include an inorganic material.

17. The method of claim 1 wherein said first pressure-sensitive adhesive composition is different from said second pressure-sensitive adhesive composition.

18. The method of claim 1 wherein said pressure-sensitive adhesive layers comprise a plurality of adjoining adhesive layers on one or both sides of the backing.

19. The method of claim 8 wherein said backing is discontinuous in the transverse direction to form longitudinal channels.

20. The method of claim 1 wherein said at least one layer of adhesive is discontinuous along at least one side of said unified molten structure such that said unified molten structure has longitudinal channels, and wherein said method further comprises:

(e) cutting said composite adhesive tape along said longitudinal channels to form tape with exposed backing edges.

* * * * *